United States Patent [19]

Ulrich et al.

[11] Patent Number: 5,691,859
[45] Date of Patent: Nov. 25, 1997

[54] DRIVE WITH FEATURES WHICH ADJUST AND ACTUATE CARTRIDGE TRANSPORT AND LIBRARY WITH SUCH DRIVE

[75] Inventors: Michael Ulrich, Boulder; Robert B. Ousley, Ward, both of Colo.

[73] Assignee: Exabyte Corporation, Boulder, Colo.

[21] Appl. No.: 575,156

[22] Filed: Dec. 19, 1995

[51] Int. Cl.$^6$ ................................................ G11B 15/68
[52] U.S. Cl. ........................................... 360/92; 369/36
[58] Field of Search ........................ 360/92, 99.02,
360/99.06; 369/36, 77.2, 178, 191, 192;
294/110.1, 116, 106; 901/31, 39

[56] References Cited

U.S. PATENT DOCUMENTS

| | | | |
|---|---|---|---|
| 2,118,991 | 5/1938 | Turechek et al. | 294/88 |
| 3,353,860 | 11/1967 | Meissner | 294/100 |
| 3,370,213 | 2/1968 | Rose | 318/513 |
| 3,467,392 | 9/1969 | Williams | 274/2 |
| 3,534,993 | 10/1970 | LeVesque, Sr. | 294/19 |
| 3,620,095 | 11/1971 | Dane | 74/469 |
| 3,718,362 | 2/1973 | Butz | 294/112 |
| 4,299,532 | 11/1981 | Bouwmeester | 414/750 |
| 4,730,861 | 3/1988 | Spencer | 294/86.4 |
| 4,836,621 | 6/1989 | Teranishi | 360/98.05 |
| 4,903,252 | 2/1990 | Tanaka et al. | 369/36 |
| 4,972,277 | 11/1990 | Sills et al. | 360/92 |
| 4,981,409 | 1/1991 | Hirose et al. | 414/225 |
| 4,984,106 | 1/1991 | Herger et al. | 360/92 |
| 5,019,927 | 5/1991 | Simone | 360/92 |
| 5,021,902 | 6/1991 | Ishikawa et al. | 360/92 |
| 5,043,962 | 8/1991 | Wanger et al. | 369/36 |
| 5,056,844 | 10/1991 | Takabayashi | 294/106 |
| 5,059,772 | 10/1991 | Younglove | 235/383 |
| 5,065,265 | 11/1991 | Pierrat | 360/92 |
| 5,103,986 | 4/1992 | Marlowe | 211/41 |
| 5,108,246 | 4/1992 | Baur | 414/223 |
| 5,164,928 | 11/1992 | Oliver et al. | 369/34 |
| 5,226,779 | 7/1993 | Yeakley | 414/753 |
| 5,233,844 | 8/1993 | Knippscheer et al. | 62/440 |
| 5,235,474 | 8/1993 | Searle | 360/71 |
| 5,237,467 | 8/1993 | Marlowe | 360/92 |
| 5,277,534 | 1/1994 | Anderson et al. | 414/281 |
| 5,278,708 | 1/1994 | Apple et al. | 360/92 |
| 5,285,333 | 2/1994 | Barr et al. | 360/92 |
| 5,303,034 | 4/1994 | Carmichael et al. | 356/375 |
| 5,341,258 | 8/1994 | Chalmers et al. | 360/92 |
| 5,416,653 | 5/1995 | Marlowe | 360/92 |
| 5,450,391 | 9/1995 | Pollard | 360/92 X |
| 5,487,579 | 1/1996 | Woodruff | 294/115 |

FOREIGN PATENT DOCUMENTS

| 1298176 | 3/1987 | U.S.S.R. | 294/106 |
|---|---|---|---|

OTHER PUBLICATIONS

"EXB–10 Cartridge Handling Subsystem", Product Description and Specification, published by EXABYTE Corporation, Boulder, Colorado, Feb. 1992.
"ACL5480 Automated Tape Library", Product Description, published by ODETICS, Anaheim, California.
EXB–120 Cartridge Handling Subsystem User's Manual, Rev. 5, Apr. 1992, pp. 2–12, and 2–13.
EXB–120 8MM Cartridge Handling Subsystem Specifications, Jan. 1993.

Primary Examiner—Stuart S. Levy
Assistant Examiner—William R. Korzuch
Attorney, Agent, or Firm—Nixon & Vanderhye, P.C.

[57] ABSTRACT

A cartridge library (30) includes a magnetic tape drive (40), a cartridge magazine (36), and a gripper assembly (200) for moving a selected data cartridge (42) between the tape drive and the cartridge magazine. A bezel (70) of the magnetic tape drive has both a gripper-tripping projection (80) and two gripper-spreading cam members (90L, 90R) formed thereon. The two cam members (90L, 90R) are positionally formed to cause gripper fingers (220L, 220R) of the cartridge gripper to spread apart when the gripper assembly travels toward the bezel. The gripper-tripping projection is formed in a position to abut and snap finger linkages (222L, 222R) and close the gripper fingers of the gripper assembly at the time the gripper assembly is to engage a cartridge.

4 Claims, 7 Drawing Sheets

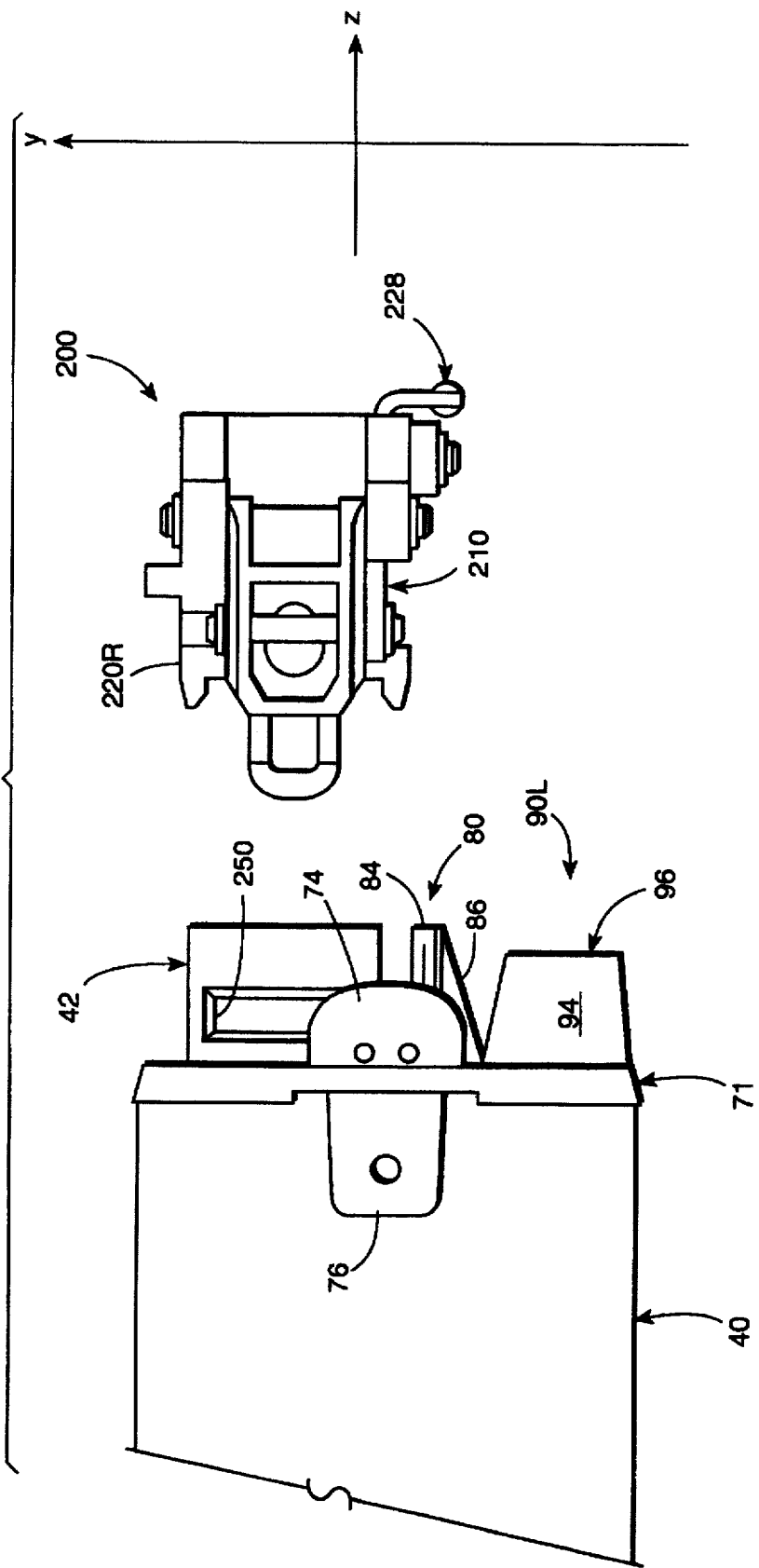

DRIVE WITH FEATURES WHICH ADJUST AND ACTUATE CARTRIDGE TRANSPORT AND LIBRARY WITH SUCH DRIVE

BACKGROUND

1. Field of Invention

This invention pertains to automated libraries for handling units of data storage medium, such as magnetic tape cartridges.

2. Related Art and Other Considerations

Magnetic tape cartridges have proven to be an efficient and effective medium for data storage, including computer back-up. Large computer systems can utilize numerous cartridges for storage purposes, and may require a plurality of drives for inputting/outputting data to the cartridges. To this end, automated libraries for cartridges have been proposed. The United States patents discussed below, all commonly assigned herewith, are incorporated herein by reference as disclosing various configurations of automated cartridge libraries, as well as subcomponents thereof (including cartridge engagement/transport mechanisms and storage racks for housing cartridges).

U.S. Pat. No. 4,984,106 to Herger et al., entitled "CARTRIDGE LIBRARY SYSTEM AND METHOD OF OPERATION THEREOF", and U.S. Pat. No. 4,972,277 to Sills et al., entitled "CARTRIDGE TRANSPORT ASSEMBLY AND METHOD OF OPERATION THEREOF", disclose an automated cartridge library which includes a cartridge transport assembly which has a pair of cartridge engagement fingers. The engagement fingers (spring-biased to a closed position) are oriented and configured to engage notches provided on opposite edges of a standard 8 mm magnetic tape cartridge. When the cartridge is positioned for loading, abutment of the cartridge with a drive or cartridge storage rack forces the cartridge flush against the cartridge transport assembly. When depression of the plunger is detected, a solenoid carried on the transport assembly operates via a linkage to rotate the engagement fingers out of the cartridge notches.

U.S. Pat. No. 5,059,772 to Younglove, entitled "READING METHOD AND APPARATUS FOR CARTRIDGE LIBRARY"; discloses a cartridge transport assembly wherein a cartridge-contacting plunger has a bar code reader. A pair of biased, retractable engagement fingers engage a selected cartridge when the plunger is sufficiently depressed by movement of the cartridge transport assembly toward the cartridge.

U.S. Pat. Nos. 5,237,467 and 5,416,653 to Marlowe, entitled "CARTRIDGE HANDLING APPATATUS AND METHOD WITH MOTION-RESPONSIVE EJECTION" disclose a cartridge ejector which ejects cartridges from between cartridge engagement members when a detector and frame assembly cease to travel in unison with one another.

U.S. patent application Ser. No. 08/112,259, now U.S. Pat. No. 5,498,116, for CARTRIDGE LIBRARY AND METHOD OF OPERATION, filed Aug. 26, 1993, discloses a cartridge picker mechanism which includes a pair of gripper fingers pivotally mounted to a picker frame. A pair of biasing springs, one for each gripper finger, are provided for biasing the gripper fingers in a direction toward a displacement path. Also provided for each gripper finger is a linkage element. Each linkage element has one end attached to the carriage member and a second end connected to its corresponding gripper finger. Driving the carriage member along the displacement path causes the gripper fingers to pivot between a cartridge engagement position and a cartridge release position, as well as a cartridge shove position. Removing a cartridge from a drive is accomplished by forcing the fingers over the cartridge until the spring-loaded fingers snap into cartridge change notches.

Thus, some prior art techniques of removing a cartridge require cartridge removal apparatus to contact a cartridge in a drive before the cartridge is actually engaged for removal. That is, either a plunger contacts the cartridge or engagement fingers ride over the cartridge and eventually snap into the cartridge change notches. Such techniques are suitable for drives, such as conventional "full height" drives, in which cartridges partially protruding from a slot in a drive bezel are precluded from motion until actually engaged by engagement fingers during the operation of removing a cartridge from a drive. However, some drives, such as the newer "half-high" form factor drives, do not necessarily preclude cartridge movement while gripping of the partially ejected cartridge is awaited during the removal operation. With such drives, any riding by engagement fingers around a cartridge tends to push the cartridge back into the drive, with the result that the cartridge is erroneously loaded back into the drive rather than removed.

What is needed is a cartridge library which removes cartridges from drives without having to contact the cartridge prior to actual engagement of the cartridge for removal purposes. Especially desirable would be simple modification of an existing library to facilitate such pre-contactless removal.

SUMMARY

A cartridge library includes a magnetic tape drive, a cartridge magazine, and a gripper assembly for moving a selected data cartridge between the tape drive and the cartridge magazine. A bezel of the magnetic tape drive has both a gripper-tripping projection and two gripper-spreading cam members formed thereon. The two cam members are positionally formed to cause griper fingers of the cartridge gripper to spread apart when the gripper assembly travels toward the bezel. The gripper-tripping projection is formed in a position to abut and snap finger linkages and close the gripper fingers of the gripper assembly at the time the gripper assembly is to engage a cartridge.

The two cam members have a right-triangular cross-sectional shape in a plane orthogonal to a front plane of the bezel. The two cam members are connected by two parallel ribs formed on the bezel.

According to a method of operating a cartridge library, cam members on the bezel of the tape drive are employed to spread sufficiently apart the gripper fingers to a finger spread apart orientation. In the finger spread apart orientation, the gripper fingers do not contact a partially ejected cartridge in the tape drive. The gripper fingers are maintained in the finger spread apart orientation using a biasing force on the gripper assembly. At a time that the cartridge is to be engaged, a projection on the bezel of the tape drive abuts the gripper assembly and overcomes the biasing force, thereby causing the gripper fingers to engage the partially ejected cartridge.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2B is a left side view of a cartridge gripper assembly of FIG. 2A shown proximate the magnetic tape drive included in the library of FIG. 1.

DETAILED DESCRIPTION OF THE DRAWINGS

Figure 1:
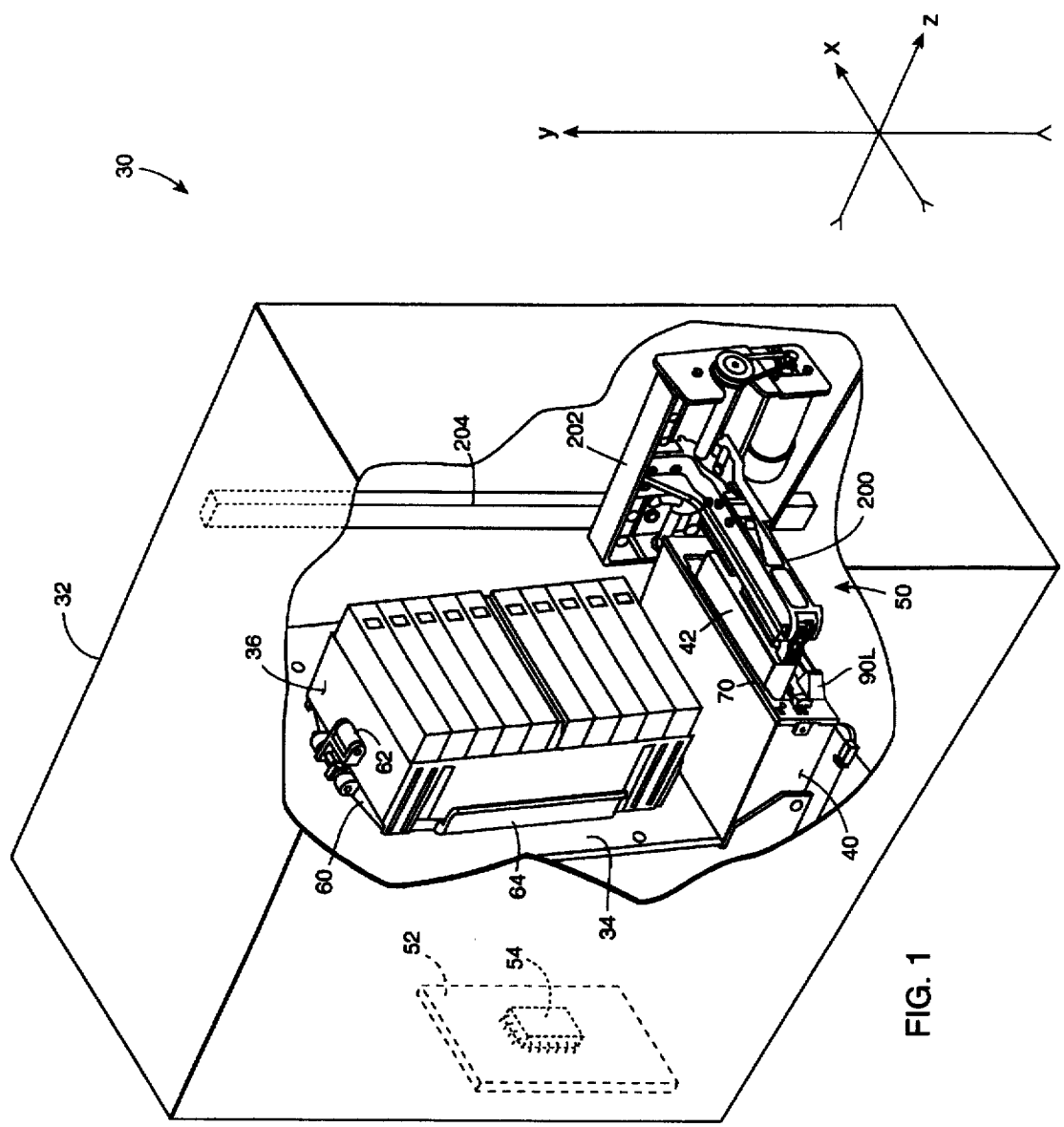
FIG. 1 is a sectioned perspective view of a library according to an embodiment of the invention.

FIG. 1 shows a cartridge library 30 which comprises an essentially rectangular housing or frame 32. As illustrated in FIG. 1, housing 32 is partially broken away to reveal internal structure of library 30, including a mounting wall 34 upon which a cartridge magazine 36 is mounted. Mounting wall 34 also has an opening formed therein through which a front portion of an I/O drive, particularly magnetic tape drive 40, extends. A magnetic tape cartridge, such as cartridge 42 shown in FIG. 1, is transported between magazine 36 and drive 40 by a cartridge transport assembly 50.

Near the rear of housing 32 is an electronics board or circuit board 52 upon which numerous library electronic components are mounted, including processor or controller 54. Controller 54 is connected to numerous sensors and encoders in housing 32 for controlling operation of library 30, including travel of transport assembly 50 in "Y" and "Z" directions as hereinafter described.

As shown in FIG. 1, magazine 36 is adapted to accommodate ten magnetic tape cartridges or cassettes, 8 mm magnetic tape cartridges. Magazine 36 is selectively retained on mounting wall 34 by magazine mounting plate 60. In particular, magazine mounting plate 60 has an unillustrated magazine support shelf; a magazine engagement mechanism 62; and, a pair of magazine stabilization and guide flanges 64. Details of magazine mounting plate 60, as well as magazine 36, are understood with reference to U.S. patent application Ser. No. 08/112,259, now U.S. Pat. No. 5,498,116, for CARTRIDGE LIBRARY AND METHOD OF OPERATION, filed Aug. 26, 1993, which is incorporated herein by reference.

Tape drive 40 is preferably a helical scan tape drive having a form factor known in the industry as a "half high" drive, such as (for example) the EXB-8505 family of drives marketed by Exabyte Corporation. Tape drive 40 has a housing which accomodates a magnetic tape cartridge via a cartridge slot, as well as mechanical elements for transporting tape in the cartridge past a read/write element or head. In addition, tape drive 40 has electronics for transducing information relative to magnetic tape in the cartridge. In conjunction with library 30 of the present invention, drive 40 differs from prior art drives in being provided with a unique bezel 70.

Figure 3:
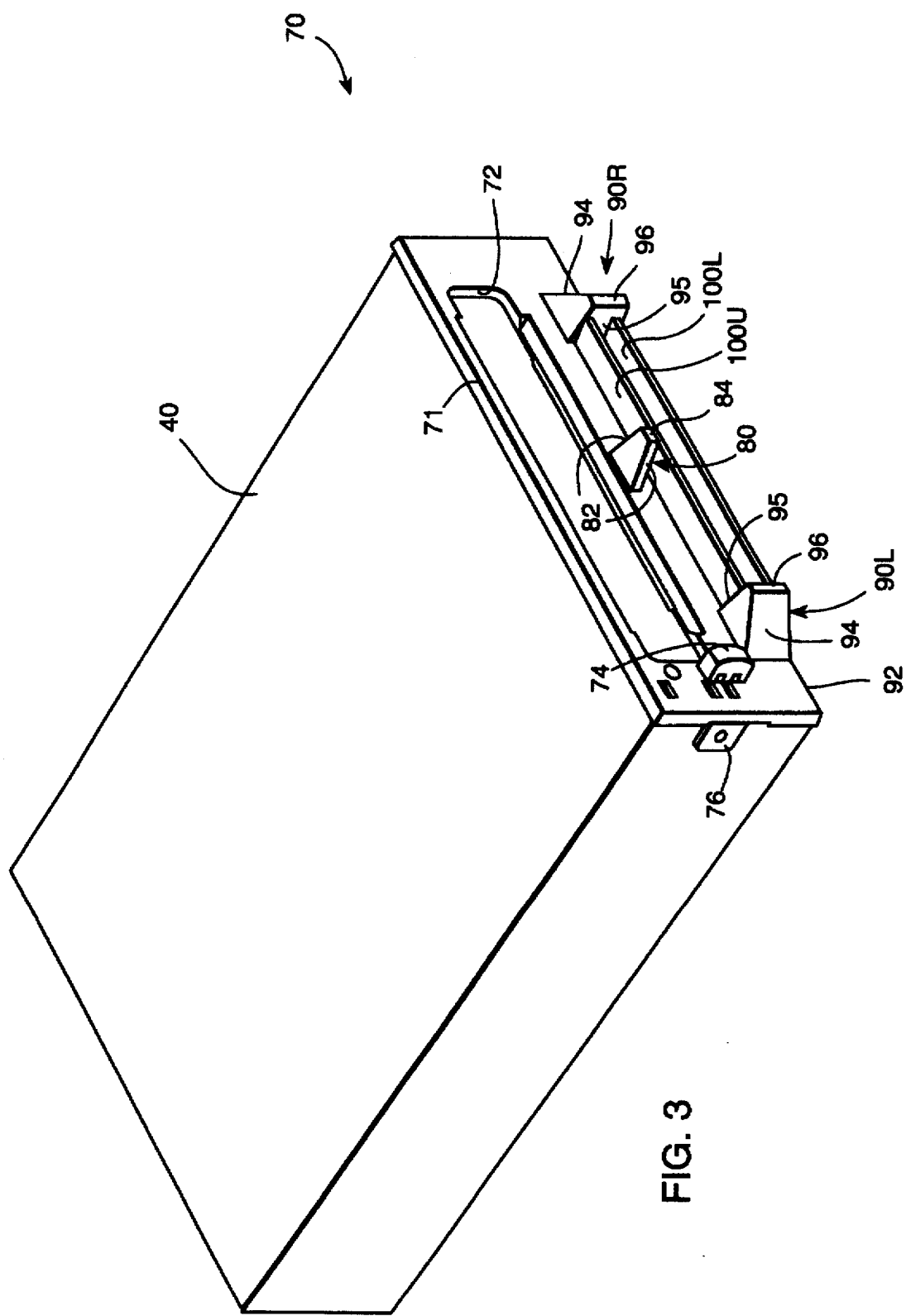
FIG. 3 is a perspective view of a magnetic tape drive included in the library of FIG. 1.

As shown in more detail in FIG. 3, bezel 70 of drive 40 comprises a bezel plate 71 which has a typical cartridge insertion slot 72 formed therein and a cartridge ejection sensor 74 formed thereon. Bezel plate 71 is secured to drive 40 by fasteners, including fasteners which extend through bezel side brackets 76 and are anchored in sidewalls of the drive housing. Bezel side brackets 76 extend orthogonally rearwardly from bezel plate 71 as shown in FIG. 3.

Bezel 70 differs from prior art bezels by having several features provided on a front surface thereof. Particularly, just below cartridge insertion slot 72 and centered between lateral edges of bezel plate 71 a gripper trip projection 80 is provided. As explained subsequently, projection 80 is formed in a position on bezel plate 71 so that, when projection 80 abuts portions of transport mechanism 50, mechanism 50 engages magnetic tape cartridge 42 situated in drive 40. Such engagement occurs when transport mechanism 50 experiences a predetermined force from projection 80 as transport mechanism 50 travels toward bezel 70. As understood with reference both to FIG. 3 and FIG. 2B, projection 80 is a planar member having the shape of an essentially truncated triangle, including two opposing angled edges 82 and a truncated apex edge 84. On its underside, projection 80 is supported by rib 86 (see FIG. 2B) which extends perpendicularly from a front face of bezel plate 71.

Bezel 70 is also provided with two cam members, illustrated as left cam member 90L and right cam member 90R in FIG. 3. With respect to the height of bezel 70, cam members 90L, 90R are positioned between projection 80 and bezel lower front edge 92. As understood from the ensuing discussion of operation of transport mechanism 50, cam members 90L, 90R are spaced apart laterally on bezel plate 71 by a distance greater than the width of magnetic tape cartridge 42 (such width being understood to lie in an essentially horizontal plane, i.e., the "X" direction, in the orientation of library 30 in the drawings).

Each cam member 90L, 90R has an essentially right-triangular cross-sectional shape in a plane orthogonal to a front plane of the bezel plate 71. As such, each cam member 90L, 90R has an hypotenuse wall 94 and a perpendicular wall 95. In addition, the right triangle is slightly truncated, so that each cam member 90L, 90R has a small truncated apex front surface 96.

Cam members 90L, 90R are bridged by two ribs 100U and 100L formed on bezel plate 71. Upper rib 100U and lower rib 100L are parallel to one another and span perpendicular walls 95 of cam members 90L and 90R.

As shown in FIG. 1 and FIG. 2B, cartridge transport mechanism 50 includes a cartridge picker or gripper assembly 200 which translates in a "Z" direction (see FIG. 1) relative to a transfer base 202 upon which picker assembly 200 is mounted. Transfer base 202 in turn translates in a "Y" direction along linear bearing assembly 204. Of particular interest to the present invention is structure and operation of gripper assembly 200. Examples of suitable structure for transfer base 202 and transfer bearing assembly 204 are provided in U.S. patent application Ser. No. 08/112,259 for CARTRIDGE LIBRARY AND METHOD OF OPERATION, filed Aug. 26, 1993, and U.S. Pat. No. 5,237,467 to Marlowe, both of which are incorporated herein by reference.

Figure 2A:
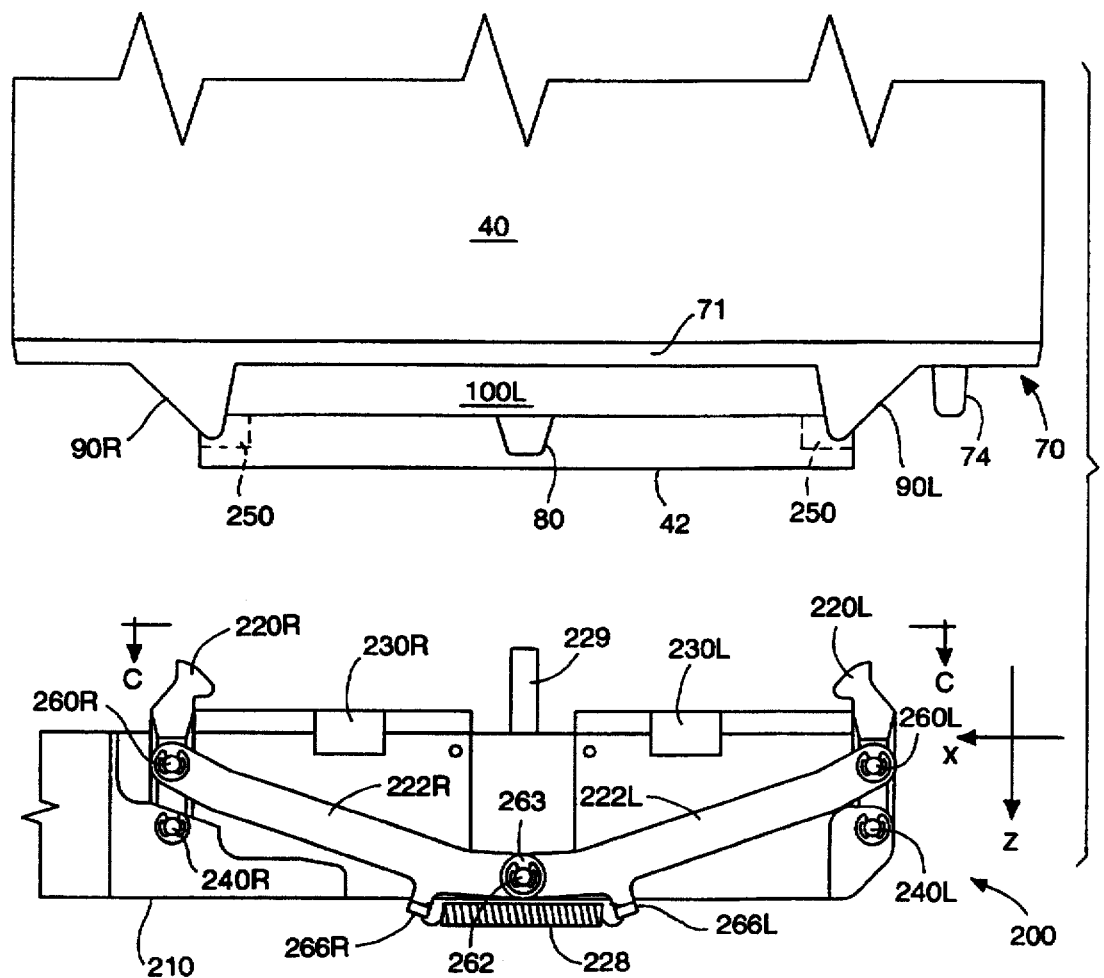
FIG. 2A is a bottom view of a cartridge gripper assembly shown proximate a bezel of a magnetic tape drive included in the library of FIG. 1.

As shown in FIG. 2A, cartridge gripper 200 includes a base member 210 upon which other members of cartridge gripper 200 are mounted and carried. Such other members include a pair of gripper fingers 220 (particularly left gripper finger 220L and right gripper finger 220R); a pair of finger linkages 222L, 222R; linkage biasing (over-assist) spring 228; a plunger 229; and linkage stop members 230L, 230R. It should be remembered that FIG. 2A is a bottom view, and accordingly left and right elements appear inverted.

Proximal ends of left and right gripper fingers 220L, 220R are pivotally attached to base member 210 at finger attachment points 240L, 240R, as shown in FIG. 2A. Such attachment points, as well as other attachment points hereinafter described, are rotatably retained by base member 210. Distal ends of gripper fingers 220L, 220R are configured to engage cartridge grip notches 250 (see FIG. 2A and FIG. 2B) of magnetic tape cartridge 42.

Figure 2C:
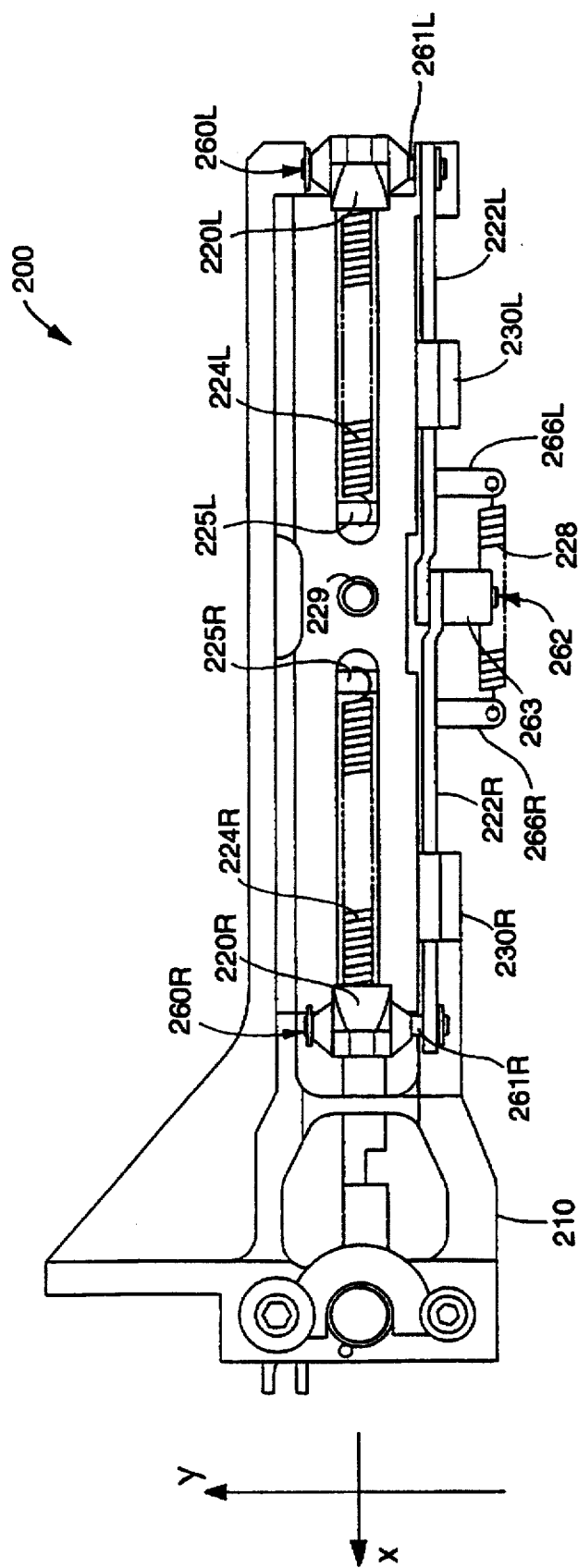
FIG. 2C is a front view of a cartridge gripper assembly of FIG. 2A taken along line C—C of FIG. 2A.

Intermediate its proximate and distal ends, each gripper finger 220 has a distal end of its corresponding finger linkage 222 pivotally attached thereto at finger/linkage attachment point 260. As shown in FIG. 2C, finger/linkage attachment points 260L, 260R are located at the top of pivot pins 261. As shown in FIG. 2C, gripper fingers 220L, 220R are biased to a closed position by finger biasing springs 224L, 224R. Finger biasing springs 224L, 224R have first ends connected about midpoints of pivot pins 261L, 261R, respectively, and second ends connected about midpoints of pivot pins 225L, 225R. Pivot pins 225L, 225R are pivotally engaged by gripper base 210.

Proximal ends of finger linkages 222L, 222R are pivotally connected to one another (but not to base member 210) at linkage pivot junction 262. As shown in FIG. 2C, finger linkages 222L, 222R are essentially coplanar, except for proximal ends of finger linkages 222L, 222R which are offset slightly to accommodate the connection. Linkage pivot junction 262 is a pivot pin which extends through proximal ends of finger linkages 222L, 222R and bumper 263. Bumper 263 is a cylindrical member through which the pivot pin forming linkage pivot junction 262 axially extends.

Finger linkages 222L, 222R are provided with respective spurs 266L, 266R. Spurs 266L, 266R extend essentially in the positive "Z" direction (see FIG. 2A) and have distal ends which extend upwardly in the negative "Y" direction (see FIG. 2C). At their bottoms, distal ends of spurs 266L, 266R are connected by over-assist spring 228, also known as an over-center assist spring. Thus, bottoms of distal ends of spurs 266L, 266R, and accordingly over-assist spring 228, are out of the plane of finger linkages 222L, 222R.

Linkage stop members 230R, 230L are preferably integral with base member 210 and have an essentially solid rectangular shape. Base member 210 can be formed of any suitable hard material, such as aluminum or hard plastic. Linkage stop members 230R, 230L extend downwardly out of the plane of base member 210 (i.e., in the −Y direction) sufficiently so that stop members 230R, 230L serve to limit the extent of travel of finger linkages 222R, 222L, respectively, in the negative "Z" direction.

Structure and operation of plunger 229 is understood with reference to U.S. Pat. No. 5,237,467 to Marlowe, incorporated herein by reference. In brief, plunger 229 is utilized only to eject a cartridge from gripper assembly 200. Although plunger 229 does slightly touch a cartridge only partially inserted into cartridge insertion slot 72, a biasing force on plunger 229 is not sufficient to insert cartridge 42 into drive 40.

Projection 80, cam members 90L, 90R, and ribs 110U, 110L are preferably integrally molded with bezel plate 71. Bezel plate 71 is preferably formed of a high-strength plastic material, such as polycarbonate/ABS, for example.

Figure 4:
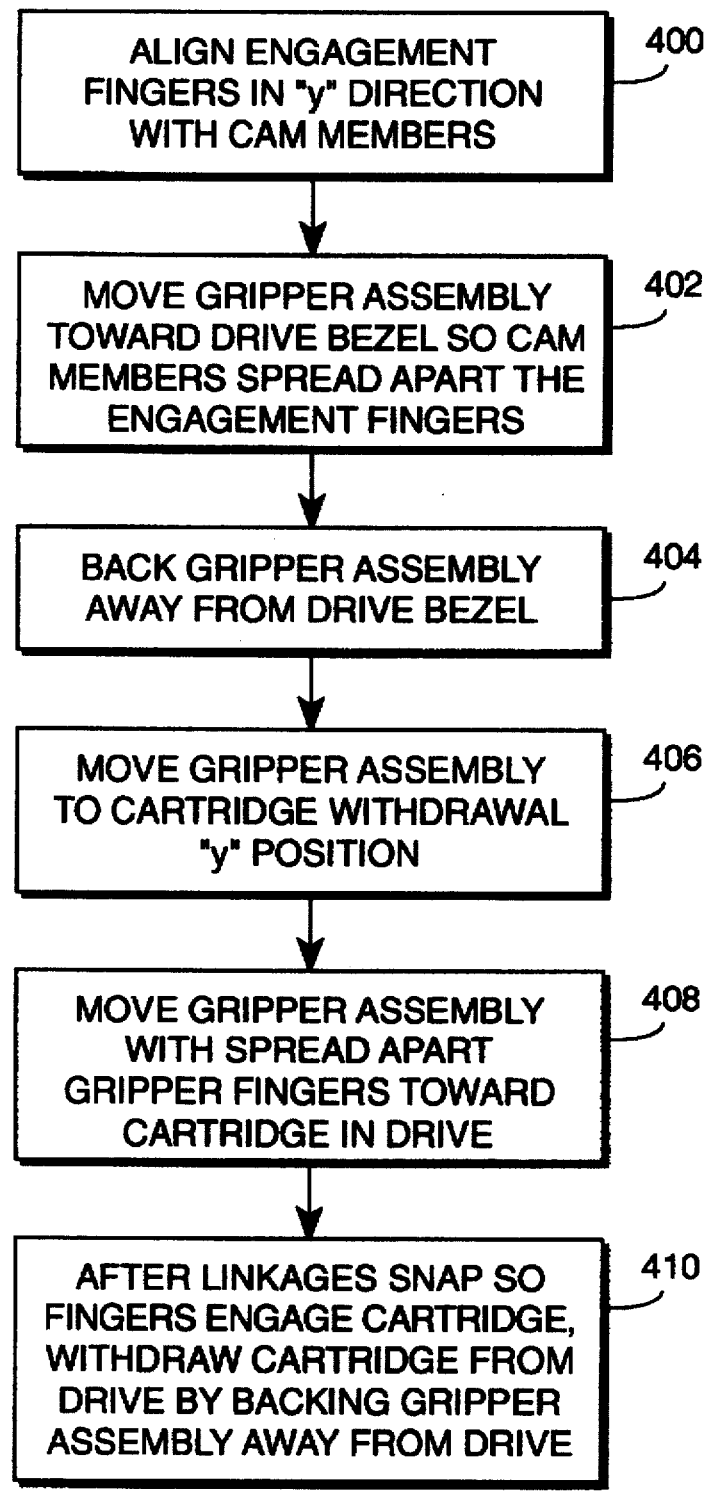
FIG. 4 is a flowchart showing steps involved in the operation of the library of FIG. 1.

FIG. 4 is a flowchart showing steps implemented by library 30 in connection with withdrawal of a cartridge from drive 40. Such steps result from commands issued by library controller 54 which (as mentioned before) is electrically connected to various components of library 30, including cartridge transport mechanism 50.

After cartridge 42 is ejected from drive 40, cartridge 42 protrudes slightly from cartridge insertion slot 72 so that cartridge engagement notches 250 are exposed in the manner shown in FIG. 2B. At such point, as reflected by step 400 of FIG. 4, transfer base 202 of transport mechanism 50 is moved to an appropriate position or coordinate in the Y direction so that gripper fingers 220L, 220R are aligned in the Y direction with cam members 90L, 90R. Reaching the appropriate position in the Y direction can be discerned by associating the current position of gripper assembly 200 of with a predefined count of a tachometer of a DC servo motor which translates transfer base 202 relative to linear bearing assembly 204.

Figure 5A:
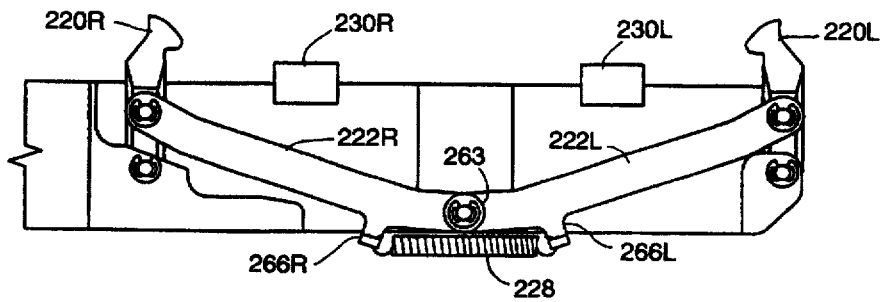
FIG. 5A, FIG. 5B, FIG. 5C, and FIG. 5D are schematic views depicting differing orientations of gripper fingers and finger linkages during the operation of the library of FIG. 1.

At step 402 gripper assembly 200 (being in the closed orientation of FIG. 5A) is moved in the −Z direction toward bezel 70. As gripper assembly 200 approaches bezel 70, spring-loaded gripper fingers 220L, 220R contact cam members 90L, 90R, respectively, and ride on hypotenuse walls 94 of cam members 90L, 90R so that cam members 90L, 90R serve to spread apart gripper fingers 220L, 220R. In this regard, a motor included in transfer base 202 moves gripper assembly 200 to an appointed position in the −Z direction whereat gripper fingers 220L, 220R encounter hypotenuse walls 94L, 94R of cam members 90L, 90R, respectively, with gripper fingers 220L, 220R spreading further apart as gripper assembly 200 travels further in the −Z direction.

Figure 5B:
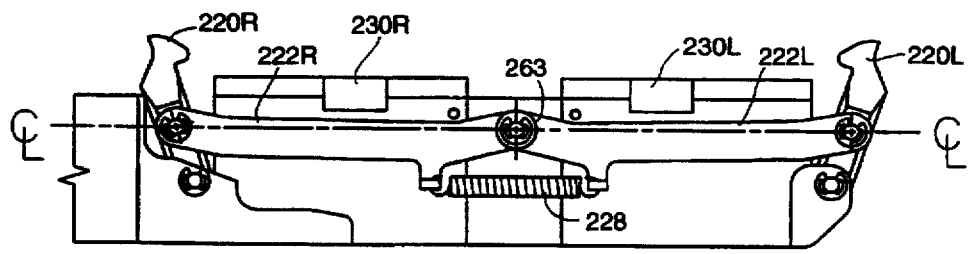

At an intermediate point in performance of step 402 shown in FIG. 5B, finger linkages 222L, 222R are spread apart by cam members 90L, 90R, so that finger linkages 222L, 222R reach a position at which they are on center (as represented by center line CL) between gripper fingers 220L, 220R. If it were not for over-center assist spring 228, and if during the situation shown in FIG. 5B gripper assembly 200 were allowed to move away from drive 40 in the +Z direction, finger linkages 222L, 222R would be unstable and could unreliably move in either direction (e.g., could unpredictable close or keep gripper fingers 220L, 220R spread apart). However, over-center assist spring 228 connected between linkage spurs 266L, 266R causes finger linkages 222L, 222R to continue to move in the same direction initiated by the action of spreading apart gripper fingers 220L, 220R, causing a slight closing of gripper fingers 220L, 220R.

Figure 5C:
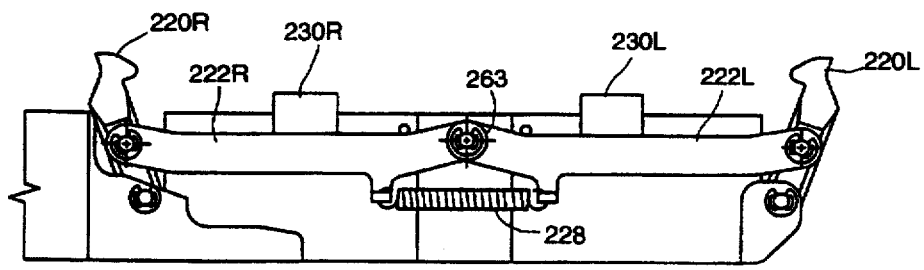

Ultimately finger linkages 222L, 222R reach the position shown in FIG. 5C, at which position finger linkages 222L, 222R contact stops 230L, 230R, respectively, and are prevented from closing by stops 230L, 230R.

At step 404, gripper assembly 200 is moved in the Z direction away from bezel 70. Then, at step 406, gripper assembly 200 is moved to a cartridge withdrawal Y position (e.g., a position aligned in the Y direction with the cartridge 42 partially residing in drive 40).

At step 408, gripper assembly 200, with its spread-apart gripper fingers 220L, 220R, is moved in the −Z direction toward ejected cartridge 42. As gripper assembly 200 approaches cartridge 42, gripper fingers 220L, 220R (being spread apart by the distance separating cams 90L, 90R) pass around but do not touch side edges of cartridge 42.

Figure 5D:
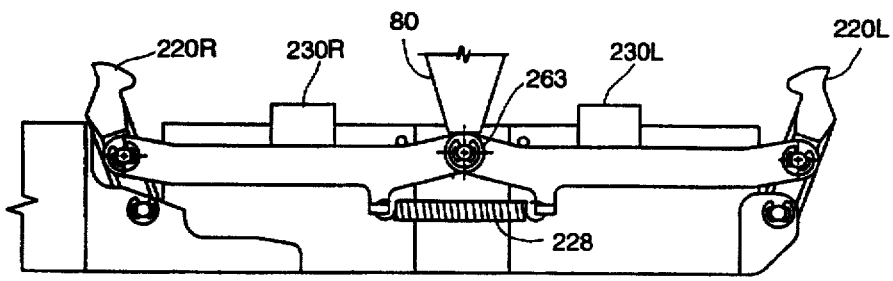

When gripper assembly 200 has reached a point in the −Z direction that the distal, cartridge notch-engaging ends of gripper fingers 220L, 220R, are aligned in the −Z direction with cartridge change notches 250, projection 80 provided on bezel 70 abuts linkage pivot junction 262, specifically bumper 263 (see FIG. 5D). When projection 80 exerts sufficient force on bumper 263 to overcome biasing apart of gripper fingers 220L, 220R by spring 228, finger linkages 222L, 222R will go over center (e.g., center line CL) and snap (by finger linkage 222R rotating clockwise about pivot point 260R [as shown in FIG. 2A] and finger linkage 222L rotating counterclockwise about pivot point 260L [e.g., back to the closed position as shown in FIG. 2A]). Such snapping causes the distal ends of gripper fingers 220L, 220R to engage securely the respective engagement notches 250 of cartridge 42.

Bumper 263 is aligned in the Y direction with projection 80 on drive 40. Moreover, provision of bumper 263 provides a suitably large target area for drive projection 80 to hit when performing step 408.

At step 410, after cartridge 42 has been engaged by gripper fingers 220L, 220R in the manner aforedescribed, gripper assembly is moved in the +Z direction (away from drive 40). After movement in the +Z direction is completed, gripper assembly 200 is moved to an appropriate Y coordinate as would occur, for example, to load the withdrawn cartridge into a cell of magazine 36.

Advantageously, the present position features a cartridge library in which placement of a cartridge gripper assembly preparatory to cartridge withdrawal does not involve contact with the cartridge prior to actual engagement of the cartridge. Libraries having cartridge engagement fingers which cooperate with pivoting linkages can easily be modified to accommodate the present invention by replacing a standard drive bezel with bezel 70 of the present invention, and by modifying the gripper assembly so that (1) finger linkages are pivotally connected and biased in accordance with the present invention; and (2) stops such as stop members 230L, 230R are provided.

From the foregoing, it is understood that a prior art gripper assembly can easily be modified to accommodate the present invention. Included among the modifications are provision of the over-center assist spring 228, stop members 230L, 230R, bumper 263.

Advantageously, having over-assist spring 228 out of plane with finger linkages 222L, 222R precludes finger linkages 222L, 222R from sagging.

While the invention has been particularly shown and described with reference to the preferred embodiments thereof, it will be understood by those skilled in the art that various alterations in form and detail may be made therein without departing from the spirit and scope of the invention. For example, the number of magnetic tape cartridges accommodated in magazine 36 can vary.

The embodiments of the invention in which an exclusive property or privilege is claimed are defined as follows:

1. A cartridge library comprising:
   a library frame;
   a magnetic tape drive mounted to the library frame;
   a storage location for at least one cartridge, the storage location being provided on the library frame;
   a cartridge gripper assembly for transporting a data cartridge between the tape drive and the storage location in the library, the gripper assembly comprising:
   a gripper base member;
   a pair of gripper fingers, each of the gripper fingers having a proximal end pivotally mounted to the gripper base member and a distal end adapted to engage a notch of a data cartridge;
   a pair of finger linkages, each finger linkage having a distal end pivotally attached to a corresponding one of the gripper fingers and a proximal end pivotally attached to an other of the finger linkages, the pair of finger linkages being pivotally attached to one another at a linkage pivot junction;
   a biasing member attached to the pair of finger linkages to provide a biasing force on the finger linkages; and
   wherein the magnetic tape drive has a projection formed in a position to abut the finger linkages at the linkage pivot junction and to overcome the biasing force on the finger linkages.

2. The apparatus of claim 1, wherein the biasing member is out of a plane of the pair of finger linkages.

3. The apparatus of claim 1, wherein the projection is formed on a bezel of the magnetic tape drive in the position to abut the finger linkages at the linkage pivot junction and to overcome the biasing force on the finger linkages.

4. The apparatus of claim 1, wherein the linkage pivot junction includes a cylindrical bumper member.

* * * * *